United States Patent
Nagashima et al.

(10) Patent No.: US 11,748,781 B1
(45) Date of Patent: Sep. 5, 2023

(54) METHODS, SYSTEMS, AND VEHICLES FOR ROUTE MODIFICATION AND DISPLAYING CONTENTS

(71) Applicant: Toyota Motor Engineering & Manufacturing North America, Inc., Plano, TX (US)

(72) Inventors: Satoshi Nagashima, Long Island City, NY (US); John F. Daly, Frisco, TX (US); Adrian Lombard, Royal Oak, MI (US); Paul Li, Mountain View, CA (US); Kruti Vekaria, Arlington, VA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/750,745

(22) Filed: May 23, 2022

(51) Int. Cl.
*G06Q 30/00* (2023.01)
*G06Q 30/0251* (2023.01)
*G01C 21/34* (2006.01)

(52) U.S. Cl.
CPC ..... *G06Q 30/0266* (2013.01); *G01C 21/3453* (2013.01)

(58) Field of Classification Search
CPC .............. G06Q 30/0266; G01C 21/3453
See application file for complete search history.

(56) References Cited

U.S. PATENT DOCUMENTS

| | | |
|---|---|---|
| 9,624,630 B1 | 4/2017 | Maus et al. |
| 10,113,279 B2 | 10/2018 | Stevens et al. |
| 2002/0097193 A1* | 7/2002 | Powers ............... G06Q 30/02 345/2.3 |
| 2010/0036717 A1* | 2/2010 | Trest ............... G06Q 30/0207 705/14.1 |
| 2019/0268743 A1* | 8/2019 | Cho ................ G06Q 30/0265 |
| 2020/0098007 A1* | 3/2020 | Sakurada ........ G06Q 30/0265 |
| 2021/0329756 A1 | 10/2021 | Chen et al. |
| 2022/0396202 A1* | 12/2022 | Tsukamoto ..... G06Q 30/0265 |

FOREIGN PATENT DOCUMENTS

| | | |
|---|---|---|
| CN | 107964900 A | 4/2018 |
| CN | 109137795 A | 1/2019 |
| KR | 101776167 B1 | 9/2017 |
| KR | 101935575 B1 | 1/2019 |
| WO | 2019090785 A1 | 5/2019 |

OTHER PUBLICATIONS

Greg Hamm, "Protecting Pedestrians With Vehicle Barriers and Fences", on-line article, Aug. 5, 2019, URL: https://www.campussafetymagazine.com/university/pedestrians-vehicle-barriers-fences/.

* cited by examiner

*Primary Examiner* — Meredith A Long
(74) *Attorney, Agent, or Firm* — Dinsmore & Shohl LLP (57) ABSTRACT

Methods and systems for displaying contents on a screen of a vehicle are provided. The method includes obtaining geographic information and population information for an area, obtaining a user geographic preference and a user population preference for a content, generating a route of a vehicle that maximizes exposure of the vehicle to targeted population in the area based on the geographic information, the population information, the user geographic preference, and the user population preference, and operating the vehicle to follow the route and display the content on a screen disposed on an exterior of the vehicle while following the route.

20 Claims, 6 Drawing Sheets

METHODS, SYSTEMS, AND VEHICLES FOR ROUTE MODIFICATION AND DISPLAYING CONTENTS

TECHNICAL FIELD

The present disclosure relates to navigational routing and, more particularly, to navigation routing that facilitates efficient advertisement.

BACKGROUND

As background, Toyota Agile Space (TAS) pods are mobile spaces that may be used for commercial purposes (e.g., retail). Users of TAS pods may want to maximize the foot traffic to and exposure of their pods to potential customers. Moreover, a TAS pod itself can be used as an effective marketing tool by showcasing the goods and/or services associated with the pod while they are on the road in an effort to sparking bystander pedestrians' curiosity and interest.

Vehicular advertisements (e.g., bus and taxi advertisements) can present a goods and/or services. However, they are inflexible in that they lack situational awareness and are incapable of altering their route on-demand to improve the efficacy of the visual content. For instance, buses typically operate in fixed routes and taxis generally drive the most direct route to the customer and the customer's destination. That is, buses and taxi visual content do not have functions to alter the routes of their corresponding vehicle. Not only are vehicular visual content inflexible, they also cannot be adapted depending on demographics, time, location, and ongoing events near their corresponding vehicle when in operation. Therefore, intelligent strategies for vehicular content that can are adaptable to enhance visual content efficiency are desired.

SUMMARY

In accordance with one embodiment of the present disclosure, a method for optimizing a route includes. The method includes obtaining geographic information and population information for an area, obtaining a user geographic preference and a user population preference for a content, generating a route of a vehicle that maximizes exposure of the vehicle to targeted population in the area based on the geographic information, the population information, the user geographic preference, and the user population preference, and operating the vehicle to follow the route and display the content on a screen disposed on an exterior of the vehicle while following the route.

In accordance with another embodiment of the present disclosure, a system for optimizing a route includes a processor. The processor may be programmed to perform operations including. A system for displaying contents on a screen of a vehicle is provided. The system includes a processor programmed to perform operations including receiving geographic information and population information for an area, receiving a user geographic preference and a user population preference for a content, generating a route for the vehicle that maximizes exposure of the vehicle to targeted population in the area based on the geographic information, the population information, the user geographic preference and the user population preference, and operating the vehicle to follow the route and display the content on the screen disposed on an exterior of the vehicle while following the route.

In accordance with yet another embodiment of the present disclosure, a vehicle for optimizing a route includes a processor. A vehicle for displaying contents on a screen of the vehicle is provided. The vehicle includes a processor programmed to perform operations including receiving geographic information and population information for an area, receiving a user geographic preference and a user population preference for a content, generating a route that maximizes exposure of the vehicle to targeted population in the area based on the geographic information, the population information, the user geographic preference, and the user population preference, and operating the vehicle to follow the route and display a content on the screen disposed on an exterior of the vehicle while following the route.

Although the concepts of the present disclosure are described herein with primary reference to user-driven automobiles, it is contemplated that the concepts will enjoy applicability to any vehicle, user-driven or autonomous. For example, and not by way of limitation, it is contemplated that the concepts of the present disclosure will enjoy applicability to autonomous automobiles.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods, systems, and vehicles for efficient visual content delivery and route modification. In embodiments disclosed herein, vehicles may be as a visual content medium that can calculate and/or receive the best route to be exposed to the greatest number of people and alter its route based on the situation. Embodiments may collect local event information (e.g., time, location, keywords, interest, etc.), census data, pedestrian location information, and road traffic and road map data from vehicles, and/or the like. The user can associate the goods and/or services of their vehicle to relevant target demographics, keywords, interests, and preferred times to showcase their goods and/or services from their vehicle. Embodiments may store the data and calculate the best route for the vehicle to be exposed to the largest number of people. To showcase the vehicle and/or its contents more effectively, the route may be calculated to expose the vehicle to the most relevant demographic during the optimal time and at the optimal place.

Figure 1A:
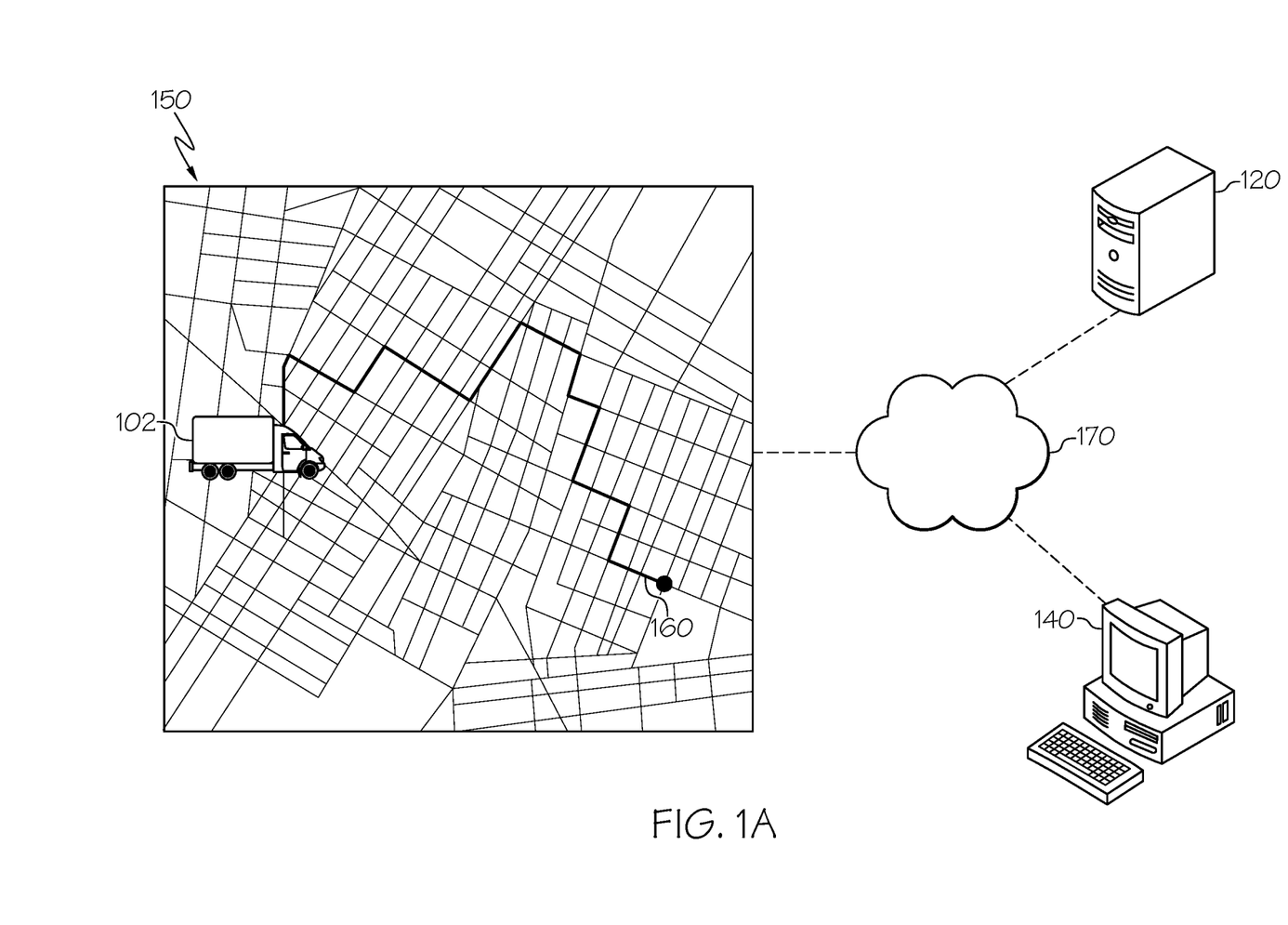
FIG. 1A depicts an overall system that determines a route of a vehicle that maximizes the exposure of content to relevant people and operates the vehicle to follow the route, according to one or more embodiments shown and described herewith.

FIG. 1A depicts an overall system that determines a route of a vehicle that maximizes the exposure of content to relevant people and operates the vehicle to follow the route, according to one or more embodiments shown and described herewith.

In embodiments, the system 100 may include a vehicle 102, a server 120, and a personal device 140. While FIG. 1A depicts a single vehicle and single personal device, the system 100 may communicate with a plurality of vehicles and a plurality of personal devices.

The vehicle 102 may be a vehicle including an automobile or any other passenger or non-passenger vehicle such as, for example, a terrestrial, aquatic, and/or airborne vehicle. In some embodiment, the vehicle 102 may be an unmanned aerial vehicle (UAV), commonly known as a drone, that may be able to deliver relatively small and light items to mobile structures on a property.

The vehicle 102 may be an autonomous and connected vehicle that navigates its environment with limited human input or without human input. The vehicle 102 may be equipped with internet access and share data with other devices both inside and outside the vehicle 102. The vehicle 102 may communicate with the server 120 and transmits its data to the server 120. For example, the vehicle 102 transmits information about its current location and destination, information about the items that it is currently carrying, information about a task that it is currently implementing, and the like.

Figure 1B:
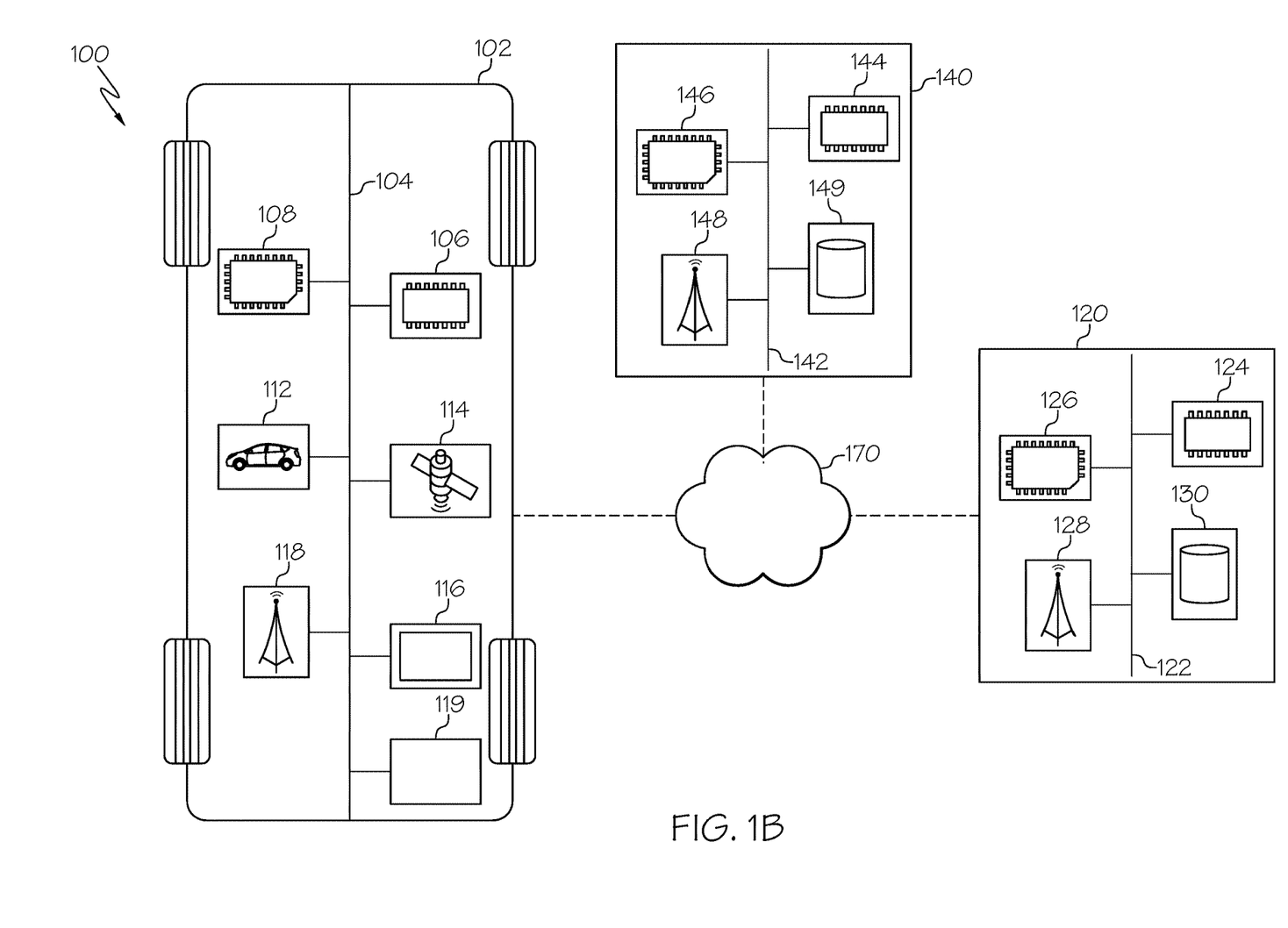
FIG. 1B depicts a schematic diagram of a system comprising a vehicle and a server, according to one or more embodiments shown and described herein.

The server 120 may be a remote server or a local server including, but not limited to, a roadside unit, an edge server, and the like. While FIGS. 1A and 1B depict a single server, the present system may include a plurality of servers that are distributed over a larger area managed by the servers. The server 120 may collect various information about an area 150, such as demographics census data, daily pedestrian traffic data and event information in the area 150 where the vehicle 102 is in operation. The server 120 may collect information from a plurality of areas. The server 120 may also collect keywords, interests, location and time of each event in the area 150.

The personal device 140 may be communicatively coupled to the vehicle 102 and the server 120 via a network 170. The personal device 140 may be a device for a commercial user. The personal device 140 may include, without limitation, a personal computer, a smartphone, a tablet, a personal media player, or any other electric device that includes communication functionality. A user of the personal device 140 may input target demographics, keywords, interests, and preferred time to showcase her products and/or services. The keywords may be keywords related to the products and/or services. The interests may be interests of people that are related to the products and/or services. The information about the input target demographics, keywords, interests, and preferred time to showcase may be communicated to the server 120. The server 120 may generate a route 160 for the vehicle 102 based on the input target demographics, keywords, interests, and preferred time to showcase received from the personal device 140 and the collected information about the area 150 including demographics census data, daily pedestrian traffic data and event information. The route may be a route that maximizes the exposure of the vehicle 102 to targeted population, e.g., potential customers of the goods and/or services. Then, the server 120 transmits the route 160 to the vehicle 102. The vehicle 102 may follow the route 160 and display contents while following the route.

Referring now to FIG. 1B, a schematic diagram of a system 100 comprising a vehicle 102 and a server 120 is depicted. The vehicle 102 may be an automobile, a boat, a plane, or any other transportation equipment. The vehicle 102 may also or instead be a device that may be placed onboard an automobile, a boat, a plane, or any other transportation equipment. The vehicle 102 may include a processor 108, a memory 106, a driving assist module 112, a network interface 118, a location module 114, and an input/output interface (I/O interface 119). The vehicle 102 also may include a communication path 104 that communicatively connects the various components of the vehicle 102.

The processor 108 may include one or more processors that may be any device capable of executing machine-readable and executable instructions. Accordingly, each of the one or more processors of the processor 108 may be a controller, an integrated circuit, a microchip, or any other computing device. The processor 108 is coupled to the communication path 104 that provides signal connectivity between the various components of the connected vehicle. Accordingly, the communication path 104 may communicatively couple any number of processors of the processor 108 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth®, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 106 is coupled to the communication path 104 and may contain one or more memory modules comprising RAM, ROM, flash memories, hard drives, or any device capable of storing machine-readable and executable instructions such that the machine-readable and executable instructions can be accessed by the processor 108. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory 106. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented on any conventional computer programming language, as pre-programmed hardware elements, or as a combination of hardware and software components.

The vehicle 102 may also include a driving assist module 112. The driving assist module 112 is coupled to the communication path 104 and communicatively coupled to the processor 108. The driving assist module 112 may include sensors such as LiDAR sensors, RADAR sensors, optical sensors (e.g., cameras), laser sensors, proximity sensors, location sensors (e.g., GPS modules), and the like. The data gathered by the sensors may be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, autonomous driving, and/or the like.

The vehicle 102 also comprises a network interface 118 that includes hardware for communicatively coupling the vehicle 102 to the server 120. The network interface 118 can be communicatively coupled to the communication path 104 and can be any device capable of transmitting and/or receiving data via a network or other communication mechanisms. Accordingly, the network interface 118 can include a communication transceiver for sending and/or receiving any wired or wireless communication. For example, the hardware of the network interface 118 may include an antenna, a modem, a LAN port, a Wi-Fi card, a WiMAX card, a cellular modem, near-field communication hardware, satellite communication hardware, and/or any other wired or wireless hardware for communicating with other networks and/or devices. The vehicle 102 may connect with one or more other connected vehicles and/or external processing devices (e.g., the server 120) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A location module 114 is coupled to the communication path 104 such that the communication path 104 communicatively couples the location module 114 to other modules of the vehicle 102. The location module 114 may comprise one or more antennas configured to receive signals from global positioning system (GPS) satellites. Specifically, in one embodiment, the location module 114 includes one or more conductive elements that interact with electromagnetic signals transmitted by GPS satellites. The received signal is transformed into a data signal indicative of the location (e.g., latitude and longitude) of the location module 114, and consequently, the vehicle 102.

The vehicle 102 may include a screen 116 that is disposed external to the vehicle 102. The screen 116 may display content that is requested by a user of the personal device 140. For example, the content may be advertisements about products, information about events, and the like.

The vehicle 102 may include an I/O interface 119. The I/O interface 119 may be disposed inside the vehicle 102 such that an occupant of the vehicle 102 may see. The I/O interface 119 may allow for data to be presented to a human driver and for data to be received from the driver. For example, the I/O interface 119 may include a screen to display information to a user, speakers to present audio information to the user, and a touch screen that may be used by the user to input information. The I/O interface 119 may output information that the vehicle 102 received from the server 120. For example, the I/O interface 119 may display instructions to follow a route generated by the server 120, such as turn-by-turn instructions. The I/O interface 119 may display the same content as the one that the screen 116 is displaying such that the occupant of the vehicle 102 may check what is currently displayed on the screen 116 in real time.

In some embodiments, the vehicle 102 may be communicatively coupled to the server 120 by a network 170 via the network interface 118. The network 170 may be a wide area network, a local area network, a personal area network, a cellular network, a satellite network, and the like.

The server 120 comprises a processor 126, a memory component 124, a network interface 128, a data storage 130, and a communication path 122. Each server 120 component is similar in features to its connected vehicle counterpart, described in detail above. It should be understood that the components illustrated in FIGS. 1A and 1B are merely illustrative and are not intended to limit the scope of this disclosure. More specifically, while the components in FIGS. 1A and 1B are illustrated as residing within vehicle 102, this is a non-limiting example. In some embodiments, one or more of the components may reside external to vehicle 102, such as with the server 120.

The personal device 140 comprises a processor 146, a memory component 144, a network interface 148, an I/O device 149, and a communication path 142. Each component of the personal device 140 is similar in features to its connected vehicle counterpart, described in detail above. The I/O device 149 may provide an interface for the user to input a user geographic preference and/or a user population preference for her content to be displayed on the screen of the vehicle 102.

It should be understood that the components illustrated in FIG. 1B are merely illustrative and are not intended to limit the scope of this disclosure. More specifically, while the components in FIG. 1B are illustrated as residing within vehicle 102, this is a non-limiting example. In some embodiments, one or more of the components may reside external to vehicle 102, such as with the server 120.

Figure 2:
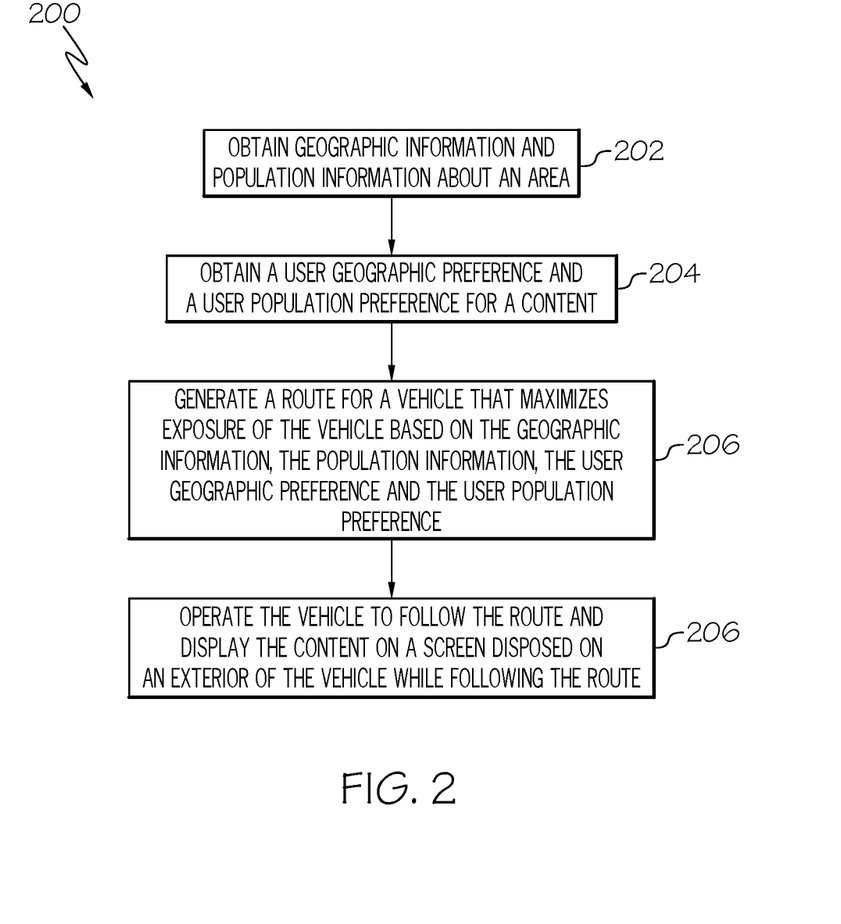
FIG. 2 depicts a flowchart of a method that may be performed by the vehicle and/or server of FIGS. 1A and 1B, according to one or more embodiments shown and described herein.

Referring now to FIG. 2, a flowchart of a method 200 that may be performed by the vehicle 102 and/or server 120 of FIGS. 1A and 1B is depicted. At step 202, geographic information and population information about an area may be obtained. For example, the server 120 may collect geographic information and population information from local, state, federal government databases and the like and map information shared by public companies. The geographic information includes information relating to the environment in which the vehicle 102 may be located. Accordingly, the geographic information includes, but is not limited to, map data, traffic data, points of interest, and/or events. The population information includes information relating to the population of the environment in which the vehicle 102 may be located. The population information includes, but is not limited to, census data, pedestrian location data, and/or survey data. The geographic and/or population information may be received from internal sources (e.g., sensor-gathered) and/or external sources (e.g., third-party server). The area may be designated by a user who wants to display her content on the screen of the vehicle 102. For example, the user may designate the area on a map, as a target area for advertising her goods or services.

At step 204, one or more user geographic preferences and/or one or more user population preferences for a content may be obtained. For example, the server 120 may receive user geographic preferences and/or user population preferences from the personal device 140. The user geographic preferences include at least one of an event, time, and/or location from the geographic information. The user geographic preferences indicate preferences of one or more items from the geographic information. For example, if the geographic information includes a list of events, the user geographic preferences may include a ranked selection of one or more events from the list of events. The user population preferences includes at least one of demographics, interests, and/or keywords form the population information. The user population preferences indicate a preference of one or more items from the population information. For example, if the population information includes demographics having socioeconomic information regarding particular neighborhoods, the user population preferences may include a ranked selection of one or more neighborhoods from the list of neighborhoods.

At step 206, a route is generated for the vehicle 102 based on the user geographic preference and the user population preference obtained in step 204 and the geographic information and population information obtained in step 202. The route is generated via any route planning algorithm. Whereas typical route planning algorithms minimize the time and/or distance for a vehicle to get to a destination, the route may be generated such that the exposure of the vehicle 102 to targeted population is maximized. That is, the route is generated such that the number of targeted population that can see the vehicle 102 and/or any items in tow by the vehicle 102 is maximized. The targeted population may be people who meet the user geographic preference and/or the user population preference. Exposure may be a function of geographic and/or population information. Geographic and/or population information may be weighted in such a function according to user geographic preferences and/or user population preferences. The route may be generated by the vehicle 102 and/or the server 120 and transmitted to the vehicle 102.

In some embodiments, the server 120 or the vehicle 102 may generate a driving strategy based on the user geographic preference and the user population preference. The driving strategy may include a vehicle speed, a stop location, stop duration, and the like. For example, the driving strategy may include a first vehicle speed for a first section of the route generated in step 206 and a second vehicle speed for a second section of the route. The first section and the second section may be determined based on geographic information and/or population information.

In some embodiments, the server 120 or the vehicle 102 may generate a content strategy based on the user geographic preference and the user population preference. The content strategy may include a plurality of content, durations of displaying respective contents, and the like. For example, the content strategy may include a first content for a first section of the route generated in step 206 and a second content for a second section of the route. The first section and the second section may be determined based on geographic information and/or population information.

At step 208, the server 120 or the vehicle operates the vehicle 102 to follow the route and display the content while following the route. For example, by referring to FIGS. 1A and 1B, the vehicle 102 follows the route 160 and displays a content designated by the user.

Figure 3:
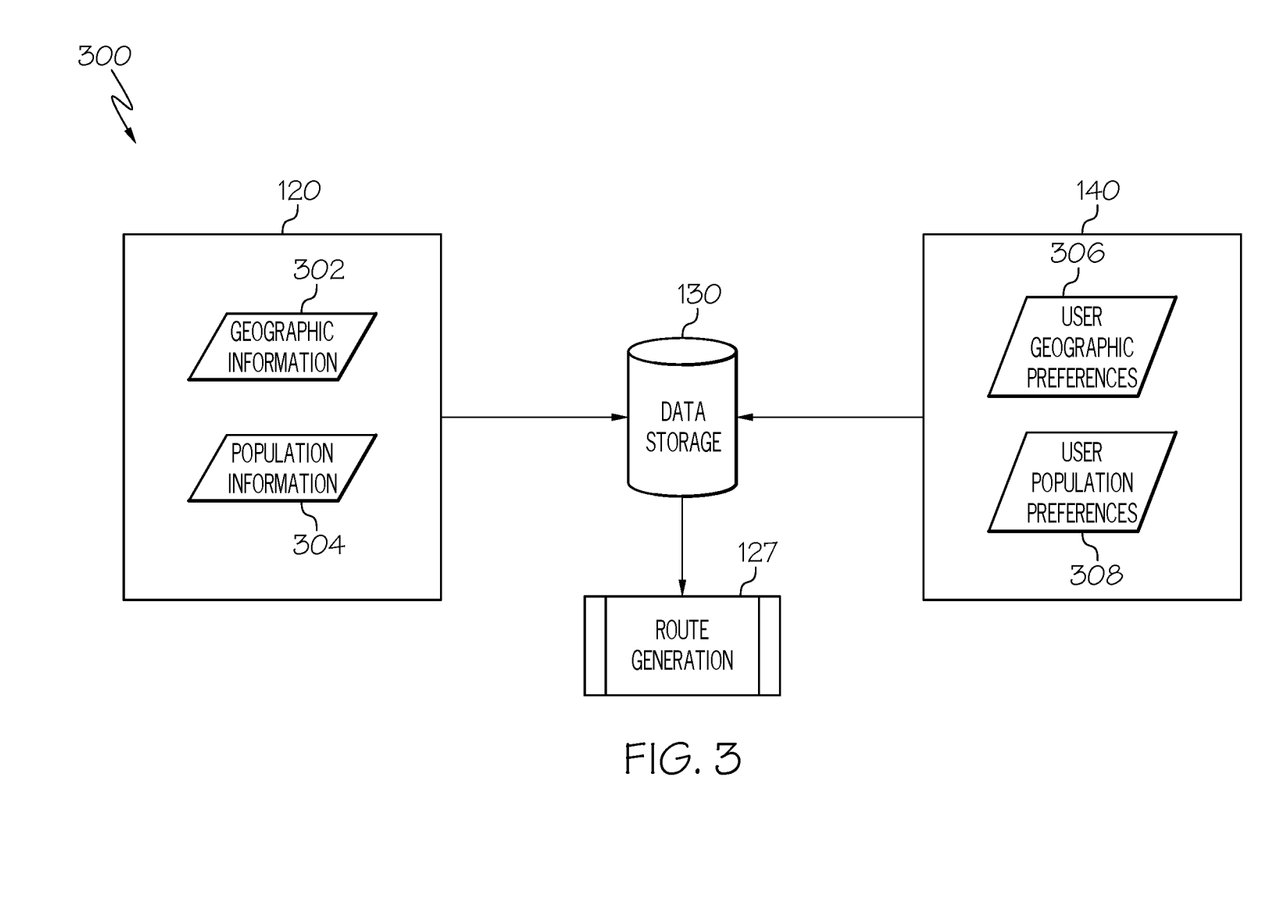
FIG. 3 depicts a schematic diagram of information flow based on the method of FIG. 2, according to one or more embodiments shown and described herein.

Referring now to FIG. 3, a schematic diagram of information flow based on the method of FIG. 2 is depicted. The server 120 may maintain a platform for managing vehicles. The platform may collect geographic information 302 and population information 304. The geographic information 302 may include at least one of map data, traffic data, points of interest, and events. The population information 304 may include at least one of census data, pedestrian location data, and survey data. In addition, the platform may collect local event information including time, location, keywords, interests of local events. The platform may also collect road traffic data and road map data from vehicles that are communicatively coupled to the server 120.

The personal device 140 may store user geographic preferences 306 and user population preferences 308. The user of the personal device 140 may input information about the products and/or services to showcase and associate the products and/or services with geographic preferences, population preferences, keywords, showcase time preferences, and the like. The user geographic preference may include at least one of events, times for showcasing products and/or services, and location for showcasing products and/or services. The user population preference includes at least one of demographics, interests, and keywords related to potential customers of the products and/or services of the user.

The data storage 130 may store all geographic information and population information received from the platform and information about the products and/or services to showcase and geographic preferences, population preferences, keywords, showcase time preferences, and the like received from the personal device 140. The data storage 130 may be in the server 120 or in the vehicle 102. The route generation module 127 may generate a route that is exposed to the largest number of people in an area based on the geographic information, population information, geographic preferences, population preferences, keywords, or showcase time preferences. The route generation module 127 may be a program module stored in the server 120 or the vehicle 102.

Figure 4:
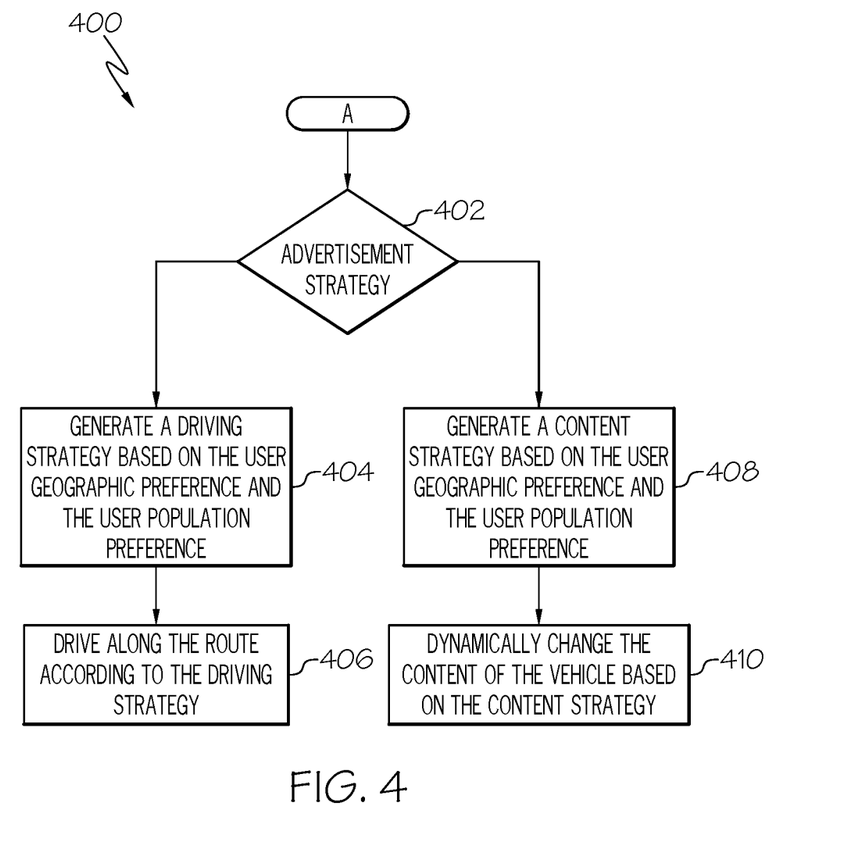
FIG. 4 depicts a flowchart of another method that may be performed by the vehicle and/or server of FIGS. 1A and 1B that continues from the method of FIG. 2, according to one or more embodiments shown and described herein.

Referring now to FIG. 4, a flowchart of another method 400 that may be performed by the vehicle 102 and/or server 120 of FIGS. 1A and 1B is depicted. The method 400 may be a continuation from the method 200 of FIG. 2. The user may input an advertisement strategy or the advertisement strategy may be determined along with the route to as another variable in the maximization function. For example, determining the route may also include determining how the vehicle 102 should drive and/or what the vehicle 102 should present as it is driving. If the advertisement strategy includes a particular way of driving, then the process may proceed to step 404. If the advertisement strategy includes a particular way of presenting content on or from the vehicle 102, then the process may proceed to step 408. It should be understood that either or both advertisement strategies may be performed.

At step 404, a driving strategy may be generated. A driving strategy may be a particular way for the vehicle 102 to drive. The driving strategy may include vehicle speeds, lane information, pull over locations, and/or any other driving instruction corresponding to a location. The driving strategy may be generated based on the user geographic preferences and/or the user population preferences. For example, a user geographic preference may indicate a preference for a particular event, in which case the vehicle 102 may turn to the lane nearest the event as it passes by. As another example, a user population preference may indicate a preference for a large tourist population, in which case the vehicle 102 may drive slower as it turns onto a road with many tourist attractions. The driving strategy may include any kind of vehicle maneuver to maximize visibility when at or near locations matching the user geographic preferences and/or the user population preferences.

At step 406, the vehicle 102 may drive along the route according to the driving strategy. The driving strategy may be a set of driving instructions, guidance, indications, and/or any other manner of guiding vehicle driving. For instance, the driving strategy for an autonomous vehicle may instruct the vehicle to drive a particular way in particular locations, and the driving strategy for a user-driven vehicle may be a set of icons for a driver of the vehicle to drive a particular way in particular locations. In some embodiments, the driving strategy may be dynamically updated. The driving strategy may be dynamically updated based on newly received sensor data, geographic information, population information, user geographic preferences, and/or use population preferences. The dynamically updated driving strategy may affect the driving of the vehicle 102 in real time so that visibility of the vehicle 102 may be maximized as it is en route to its destination.

At step 408, generating a content strategy may be generated. A content strategy may be a particular order, arrangement, selection, and/or the like of one or more pieces of content, wherein content may be one or more objects for presentation to bystanders as the vehicle 102 is driving. For example, if the vehicle 102 is a mobile store, then the content may be the goods viewable by the bystanders through the windows of the vehicle 102. As another example, if the vehicle 102 has an external display, then the content may be a multimedia file for presentation to bystanders of the vehicle 102. The content strategy may be based on the user geographic preferences and/or the user population preferences. For example, a user geographic preference may indicate a preference for a particular event, in which case the vehicle 102 may present, on an electronic display affixed to the vehicle's exterior, content related to the particular event. As another example, a user population preference may indicate a preference for a high income neighborhood, in which case the vehicle 102 may arrange goods that it is carrying such that the higher-end goods are viewable by bystanders through the windows of the vehicle 102.

At step 410, the vehicle 102 may dynamically change its content according to the content strategy. The content strategy may be a set of content instructions, guidance, indications, and/or any other manner of guiding content selection and/or display. For instance, the content strategy may instruct the vehicle show particular goods and/or services in particular locations. In some embodiments, the content strategy may be dynamically updated. The content strategy may be dynamically updated based on newly received sensor data, geographic information, population information, user geographic preferences, and/or use population preferences. The dynamically updated content strategy may be affect the content displayed from the vehicle 102 in real time so that items visible from the vehicle 102 may be tailored to the vehicle's surroundings.

Figure 5:
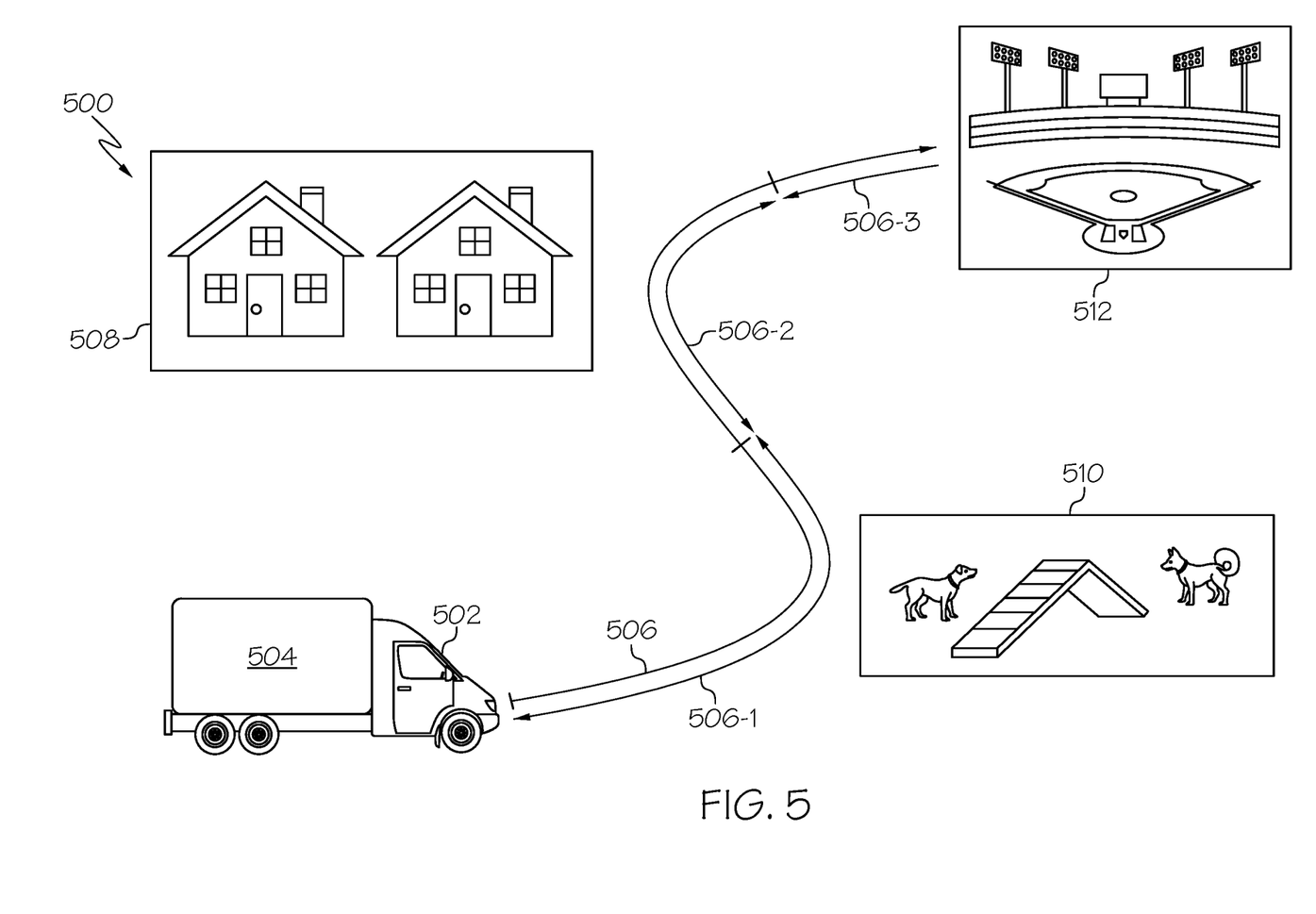
FIG. 5 depicts an exemplary embodiment of a system, according to one or more embodiments shown and described herein.

Referring now to FIG. 5, an exemplary embodiment of a system 500 is depicted.

The vehicle 502 may include a screen for displaying content related to products and/or services. The vehicle 502 may follow a route 506 that is determined by the server 120. The route 506 may pass through three different regions 508, 510, 512. The region 508 is a residential region, where single houses or apartments are located. The region 510 may include a dog park. The region 512 may include a sport stadium, such as a baseball stadium, a football stadium, a speedway and the like.

In embodiments, the route 506 may include three sections: a first section 506-1, a second section 506-2, and a third section 506-3. The route 506 may have less than or more than three sections. A driving strategy may be generated based on the user geographic information and the user population information about regions 508, 510, 512, the user geographic preference and the user population preference. The driving strategy may include different vehicle speeds for different sections. For example, the driving strategy may include a first vehicle speed for the first section 506-1, a second vehicle speed for the second section 506-2, and a third vehicle speed for the third section 506-3. Specifically, while driving in the first section 506-1, the vehicle 502 may drive relatively slow because many people are in the region 510 and the people in the region 510 may correspond to the user population preference of the user who currently requested her content to be displayed on the screen of the vehicle 502. During the second section 506-2, the vehicle 502 may drive relatively fast because less people are on the street in the residential region 508 and most of the people in the region 508 do not correspond to the user population preference of the user who currently requested her content to be displayed on the screen of the vehicle 502. During the third section 506-3, the vehicle 502 may drive slowest because people are crowded on the street waiting for a sport game near the sport stadium 512, and the people near the sport stadium 512 may correspond to the user population preference of the user who currently requested her content (e.g., sports wears, gears, and the like) to be displayed on the screen of the vehicle 502. In addition, the time when the vehicle 502 arrives at the third section 506-3 may correspond to the time of the sports event at the sport stadium 512. In some embodiments, the vehicle 502 may adjust its speed along the route 506 to arrive at the third section 506-3 approximately at the time of the sport event at the sport stadium 512 or before the sport event.

In some embodiments, the content to be displayed on the screen of the vehicle may be determined based on the information about an area and/or a building structure that the vehicle passes by. For example, by referring to FIG. 5, the first section 506-1 passes by the region 510 that includes a dog park. Based on the information about the dog park, the screen 504 of the vehicle 502 may display advertisements related to pet products, e.g., advertisements on animal care products. The advertisements on animal care products may be previously registered into the server 120 by a user selling animal care products. The second section 506-2 passes by the area 520 of a neighborhood with high household income. Based on the information about the average income in the area, the screen 504 of the vehicle 502 may display advertisements on luxury goods, e.g., advertisements on luxury apparel products, luxury jewelry, etc. The advertisements on luxury goods may be previously registered into the server 120 by a user selling the luxury goods. The third section 506-3 passes by the region 530 including a speedway. Based on the information about the speedway, the screen 504 of the vehicle 502 may display advertisements on motorsports related products. The advertisements on the motorsports related products may be previously registered into the server 120 by a user selling the motorsports related products.

In some embodiments, the vehicle 502 may dynamically change its route based on the content to be displayed. For example, the vehicle 502 received requests for displaying content for luxury goods and motorsports related products, but did not receive a request for displaying content for pet products, or the request for displaying content for pet products may be canceled. Then, the vehicle 502 may update its route 506 to a route that skips the first section 506-1. Specifically, the updated route may be straight to the second section 506-2 without diverting to the first section 506-1.

In some embodiments, the vehicle 502 may stop at a location for an extended period of time based on the time of the day, the time of any event, and geographic information. For example, the server 120 may transmit information about the time of the racing, e.g., 3 pm to 5 pm at the speedway to the vehicle 502. Then, the vehicle 502 may arrive at the third section 506-3 before the racing, for example, 2:30 pm, and stop and display content related to motorsports related products until after the start of the racing, for example, until 3:10 pm. As another example, the server 120 may transmit peak commuting time in the region 508, e.g., between 8:00 am-9:00 am and 4:00 pm-5:00 pm, to the vehicle 502. Then, the vehicle 502 may stop at the opposite side of commuting vehicles during the peak commuting time in the second section 506-2.

It should now be understood that a method for optimizing a route for displaying content to potential customers is provided. The method includes obtaining geographic information and population information; obtaining a user geographic preference and a user population preference based on the geographic information and the population information; generating a route that maximizes exposure of a vehicle based on the user geographic preference and the user population preference; and operating the vehicle to follow the route and display a content on a screen disposed on an exterior of the vehicle while following the route. The present method calculates the best route to be exposed to the largest number of targeted people's eyes and alter the route for a vehicle based on various attributes such as the number of people, demographics, time, location and events in a region in order to attract potential customers effectively.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for displaying contents on a screen of a vehicle, comprising:
   obtaining geographic information and population information for an area;
   obtaining a user geographic preference and a user population preference for a content;
   generating a route of the vehicle that maximizes exposure of the vehicle to targeted population in the area based on the geographic information, the population information, the user geographic preference, and the user population preference, the route including a first section associated with the content and a second section associated with another content;
   operating the vehicle to autonomously drive following the route and display the content on the screen disposed on an exterior of the vehicle while following the route;
   receiving a request for cancellation of displaying the content; and
   dynamically updating the route of the vehicle to a route that skips the first section in response to receiving the cancellation of displaying the content.

2. The method of claim 1, wherein the geographic information includes at least one of map data, traffic data, points of interest, and events.

3. The method of claim 1, wherein the population information includes at least one of census data, pedestrian location data, and survey data.

4. The method of claim 1, wherein the user geographic preference includes at least one of events, times, and location.

5. The method of claim 1, wherein the user population preference includes at least one of demographics, interests, and keywords.

6. The method of claim 1, further comprising:
generating a driving strategy based on the user geographic preference and the user population preference, wherein the driving strategy includes at least a first vehicle speed; and
operating the vehicle to drive along the route according to the driving strategy.

7. The method of claim 6, wherein the route includes a first section and a second section;
the driving strategy includes a second vehicle speed; and
operating the vehicle to drive along the route according to the driving strategy includes operating the vehicle to drive at the first vehicle speed while in the first section and operating to drive at the second vehicle speed while in the second section according to the driving strategy.

8. The method of claim 1, further comprising:
generating a content strategy based on the user geographic preference and the user population preference, wherein the content strategy includes a first content; and
dynamically changing a content displayed on the screen of the vehicle based on the content strategy.

9. The method of claim 8, wherein the route includes a first section and a second section;
the content strategy includes a second content; and
dynamically changing the content displayed on the screen of the vehicle includes displaying the first content while in the first section and displaying the second content while in the second section according to the content strategy.

10. The method of claim 1, further comprising:
dynamically changing the route of the vehicle based on a change of contents to be display on the screen of the vehicle.

11. A system for displaying contents on a screen of a vehicle, comprising:
a processor programmed to perform operations comprising:
receiving geographic information and population information for an area;
receiving a user geographic preference and a user population preference for a content;
generating a route for the vehicle that maximizes exposure of the vehicle to targeted population in the area based on the geographic information, the population information, the user geographic preference and the user population preference, the route including a first section associated with the content and a second section associated with another content;
operating the vehicle to autonomously drive following the route and display the content on the screen disposed on an exterior of the vehicle while following the route;
receiving a request for cancellation of displaying the content; and
dynamically updating the route of the vehicle to a route that skips the first section in response to receiving the cancellation of displaying the content.

12. The system of claim 11, wherein the geographic information includes at least one of map data, traffic data, points of interest, and events.

13. The system of claim 11, wherein the population information includes at least one of census data, pedestrian location data, and survey data.

14. The system of claim 11, wherein:
the user geographic preference includes at least one of events, times, and location; and
user population preference includes at least one of demographics, interests, and keywords.

15. The system of claim 11, wherein the operations further comprises:
dynamically changing the route of the vehicle based on a change of contents to be display on the screen of the vehicle.

16. The system of claim 11, wherein the operations further comprises:
generating a driving strategy based on the user geographic preference and the user population preference, wherein the driving strategy includes at least a first vehicle speed; and
operating the vehicle to drive along the route according to the driving strategy.

17. The system of claim 16, wherein the route includes a first section and a second section;
the driving strategy includes a second vehicle speed; and
operating the vehicle to drive along the route according to the driving strategy includes operating the vehicle to drive at the first vehicle speed while in the first section and to drive at the second vehicle speed while in the second section according to the driving strategy.

18. The system of claim 11, the operations further comprises:
generating a content strategy based on the user geographic preference and the user population preference, wherein the content strategy includes a first content; and
dynamically changing a content displayed on the screen of the vehicle based on the content strategy.

19. The system of claim 18, wherein the route includes a first section and a second section;
the content strategy includes a second content; and
dynamically changing the content displayed on the screen of the vehicle includes displaying the first content while in the first section and displaying the second content while in the second section according to the content strategy.

20. A vehicle for displaying contents on a screen of the vehicle, comprising:
a processor programmed to perform operations comprising:
receiving geographic information and population information for an area;
receiving a user geographic preference and a user population preference for a content;
generating a route that maximizes exposure of the vehicle to targeted population in the area based on the geographic information, the population information, the user geographic preference, and the user population preference, the route including a first section associated with the content and a second section associated with another content;
operating the vehicle to autonomously drive following the route and display a content on the screen disposed on an exterior of the vehicle while following the route;

receiving a request for cancellation of displaying the content; and dynamically updating the route of the vehicle to a route that skips the first section in response to receiving the cancellation of displaying the content.

\* \* \* \* \*

UNITED STATES PATENT AND TRADEMARK OFFICE
CERTIFICATE OF CORRECTION

PATENT NO. : 11,748,781 B1
APPLICATION NO. : 17/750745
DATED : September 5, 2023
INVENTOR(S) : Satoshi Nagashima et al.

It is certified that error appears in the above-identified patent and that said Letters Patent is hereby corrected as shown below:

In the Specification

In Column 10, Line(s) 10, before "affect", delete "be".

In the Claims

In Column 13, Line(s) 42, Claim 10, delete "display" and insert --displayed--, therefor.

In Column 14, Line(s) 16, Claim 15, delete "display" and insert --displayed--, therefor.

Signed and Sealed this
Nineteenth Day of March, 2024

Katherine Kelly Vidal
*Director of the United States Patent and Trademark Office*